US008846776B2

(12) United States Patent
Herrington et al.

(10) Patent No.: US 8,846,776 B2
(45) Date of Patent: Sep. 30, 2014

(54) FILLED POLYURETHANE COMPOSITES AND METHODS OF MAKING SAME

(75) Inventors: Ronald M. Herrington, Brazoria, TX (US); Kengqing Jian, Jersey City, NJ (US)

(73) Assignee: Boral IP Holdings LLC, Rosewell, GA (US)

( * ) Notice: Subject to any disclaimer, the term of this patent is extended or adjusted under 35 U.S.C. 154(b) by 0 days.

(21) Appl. No.: 12/855,380

(22) Filed: Aug. 12, 2010

(65) Prior Publication Data

US 2011/0086934 A1  Apr. 14, 2011

Related U.S. Application Data

(60) Provisional application No. 61/233,984, filed on Aug. 14, 2009.

(51) Int. Cl.
| | |
|---|---|
| C08G 18/00 | (2006.01) |
| C08G 18/36 | (2006.01) |
| C08K 11/00 | (2006.01) |
| C08K 3/04 | (2006.01) |
| C08G 18/66 | (2006.01) |
| C08G 101/00 | (2006.01) |
| C08L 75/04 | (2006.01) |

(52) U.S. Cl.
CPC ............ C08G 18/36 (2013.01); C08K 11/005 (2013.01); C08K 3/04 (2013.01); C08G 2101/00 (2013.01); C08L 75/04 (2013.01); C08G 18/6662 (2013.01)
USPC ........... 521/177; 521/122; 521/123; 521/172; 521/173; 528/48; 528/74.5; 528/76; 528/80; 528/85

(58) Field of Classification Search
USPC ......... 528/48, 74.5, 76, 80, 85; 521/122, 123, 521/172, 173, 177
See application file for complete search history.

(56) References Cited

U.S. PATENT DOCUMENTS

| | | | |
|---|---|---|---|
| 529,535 A | 11/1894 | Smith | |
| 529,538 A | 11/1894 | Vaughn | |
| 2,526,033 A | 10/1950 | Lyon | |
| 790,527 A | 1/1956 | Barthel, Jr. | |
| 2,817,875 A | 12/1957 | Harris et al. | |
| 2,833,730 A | 5/1958 | Barthel, Jr. | |
| RE24,514 E | 8/1958 | Hoppe et al. | |
| 2,902,388 A | 9/1959 | Szukiewicz | |
| 2,983,693 A | 5/1961 | Sievers | |
| 3,065,500 A | 11/1962 | Berner | |
| 3,071,297 A | 1/1963 | Lee | |
| 3,078,240 A | 2/1963 | Hoshino et al. | |
| 3,078,512 A | 2/1963 | De Haven | |
| 3,178,490 A | 4/1965 | Petrino et al. | |
| 3,182,104 A | 5/1965 | Cwik | |
| 3,223,027 A | 12/1965 | Soda et al. | |
| 3,262,151 A | 7/1966 | Oxel | |
| 3,269,961 A | 8/1966 | Bruson et al. | |
| 3,308,218 A | 3/1967 | Wiegand et al. | |
| 3,466,705 A | 9/1969 | Richie | |
| 3,528,126 A | 9/1970 | Ernst et al. | |
| 3,566,448 A | 3/1971 | Ernst | |
| 3,608,008 A | 9/1971 | Soukup et al. | |
| 3,644,168 A | 2/1972 | Bonk et al. | |
| 3,698,731 A | 10/1972 | Jost et al. | |
| 3,726,624 A | 4/1973 | Schwarz | |
| 3,728,288 A | 4/1973 | Cobbs, Jr. et al. | |
| 3,736,081 A | 5/1973 | Yovanovich | |
| 3,738,895 A | 6/1973 | Paymal | |
| 3,764,247 A | 10/1973 | Garrett et al. | |
| 3,768,937 A | 10/1973 | Haga et al. | |
| 3,774,428 A | 11/1973 | Derry et al. | |
| 3,802,582 A | 4/1974 | Brock | |
| 3,816,043 A | 6/1974 | Snelling et al. | |
| 3,819,574 A | 6/1974 | Brown et al. | |
| 3,824,057 A | 7/1974 | Kornylak et al. | |
| 3,830,776 A | 8/1974 | Carlson et al. | |
| 3,832,429 A | 8/1974 | Charpentier | |

(Continued)

FOREIGN PATENT DOCUMENTS

| | | |
|---|---|---|
| CA | 2037130 | 1/2006 |
| CN | 1251596 | 4/2000 |

(Continued)

OTHER PUBLICATIONS

Cayli et al., "Soybean Oil Based Isocyanates: Synthesis, Characterizations, and Polymerizations," Conference Abstract, 2nd Workshop on Fats and Oils as Renewable Feedstock for the Chemical Industry, Mar. 22-24, 2009.
Dolui, S.K., "Unusual effect of filler (CaCO3) on thermal degradation of polyurethane," Journal of Applied Polymer Science, 53(4): 463-465 (2003).
Hojabri et al., "Fatty Acid-Derived Diisocyanate and Biobased Polyurethane Produced from Vegetable Oil: Synthesis, Polymerization, and Characterization," Biomacromolecules, 10(4):884-891 (2009), abstract.
Horvath Jr., M., "Structural Polyurethane Foam Reaction Injection Molding," Journal of Cellular Plastics, September/ October, pp. 289-293, 1976.
Inukai et al., "Glass Fiber Reinforced Rigid Polyurethane Foam (Elson Neo-Lumber FFU)," International Progress in Urethanes, vol. 5, Lancaster, PA, Technomic Publishing Co., Inc., 1988.

(Continued)

*Primary Examiner* — Michael L Leonard
(74) *Attorney, Agent, or Firm* — Joel T. Charlton

(57) ABSTRACT

Composite materials and methods for their preparation are described herein. The composite materials include a polyurethane made from the reaction of an isocyanate and a mixture of polyols, and coal ash (e.g., fly ash). The mixture of polyols comprises at least two polyols including a high hydroxyl number polyol having a hydroxyl number greater than 250 and comprising from about 1% to about 25% by weight of the total polyol content used to form the polyurethane, and a low hydroxyl number polyol having a hydroxyl number of 250 or lower. The coal ash is present in amounts from about 40% to about 90% by weight of the composite material. Also described is a method of preparing a composite material, including mixing an isocyanate, a mixture of at least two polyols, coal ash (e.g., fly ash), and a catalyst.

30 Claims, No Drawings

(56) References Cited

U.S. PATENT DOCUMENTS

| | | | |
|---|---|---|---|
| 3,841,390 A | 10/1974 | DiBenedetto et al. | |
| 3,843,757 A | 10/1974 | Ehrenfreund et al. | |
| 3,852,387 A | 12/1974 | Bortnick et al. | |
| 3,867,494 A | 2/1975 | Rood et al. | |
| 3,878,027 A | 4/1975 | Troutner | |
| 3,890,077 A | 6/1975 | Holman | |
| 3,910,179 A | 10/1975 | Troutner | |
| 3,917,547 A | 11/1975 | Massey | |
| 3,917,571 A | 11/1975 | Olstowski et al. | |
| 3,917,774 A | 11/1975 | Sagane et al. | |
| 3,928,258 A | 12/1975 | Alexander | |
| 3,963,679 A | 6/1976 | Ullrich et al. | |
| 3,981,654 A | 9/1976 | Rood et al. | |
| 3,991,005 A | 11/1976 | Wallace | |
| 3,999,230 A | 12/1976 | Bruning et al. | |
| 4,005,035 A | 1/1977 | Deaver | |
| 4,025,257 A | 5/1977 | Sagane et al. | |
| 4,042,314 A | 8/1977 | Bruning et al. | |
| 4,051,742 A | 10/1977 | Johansson et al. | |
| 4,060,579 A | 11/1977 | Schmitzer et al. | |
| 4,065,410 A | 12/1977 | Schafer et al. | |
| 4,073,840 A | 2/1978 | Saidla | |
| 4,078,032 A | 3/1978 | Wenner | |
| 4,092,276 A | 5/1978 | Narayan | |
| 4,104,094 A | 8/1978 | Peterson | |
| 4,107,248 A | 8/1978 | Schlieckmann | |
| 4,120,626 A | 10/1978 | Keller | |
| 4,127,040 A | 11/1978 | Moore et al. | |
| 4,128,369 A | 12/1978 | Kemerer | |
| 4,137,200 A | 1/1979 | Wood et al. | |
| 4,141,862 A | 2/1979 | Raden et al. | |
| 4,143,759 A | 3/1979 | Paradis | |
| 4,149,840 A | 4/1979 | Tippmann | |
| 4,153,768 A | 5/1979 | Blount | |
| 4,160,749 A | 7/1979 | Schneider et al. | |
| 4,160,853 A | 7/1979 | Ammons | |
| 4,163,824 A | 8/1979 | Saidla | |
| 4,164,439 A | 8/1979 | Coonrod | |
| 4,164,526 A | 8/1979 | Clay et al. | |
| 4,165,414 A | 8/1979 | Narayan et al. | |
| 4,180,538 A | 12/1979 | Morikawa et al. | |
| 4,209,605 A | 6/1980 | Hoy et al. | |
| 4,210,572 A | 7/1980 | Herman et al. | |
| 4,214,864 A | 7/1980 | Tabler | |
| 4,221,877 A | 9/1980 | Cuscurida et al. | |
| 4,240,950 A | 12/1980 | von Bonin et al. | |
| 4,241,131 A * | 12/1980 | Bailey | 442/374 |
| 4,243,755 A | 1/1981 | Marx et al. | |
| 4,246,363 A | 1/1981 | Turner | |
| 4,247,656 A | 1/1981 | Janssen | |
| 4,248,975 A | 2/1981 | Satterly | |
| 4,251,428 A | 2/1981 | Recker et al. | |
| 4,254,002 A | 3/1981 | Sperling et al. | |
| 4,254,176 A | 3/1981 | Muller et al. | |
| 4,256,846 A | 3/1981 | Ohashi et al. | |
| 4,260,538 A | 4/1981 | Iseler et al. | |
| 4,261,946 A | 4/1981 | Goyert et al. | |
| 4,272,377 A | 6/1981 | Gerlach et al. | |
| 4,275,033 A | 6/1981 | Schulte et al. | |
| 4,276,337 A | 6/1981 | Coonrod | |
| 4,282,329 A | 8/1981 | von Bonin et al. | |
| 4,282,988 A | 8/1981 | Hulber, Jr. | |
| 4,284,826 A | 8/1981 | Aelony | |
| 4,290,248 A | 9/1981 | Kemerer et al. | |
| 4,300,776 A | 11/1981 | Taubenmann | |
| 4,330,494 A | 5/1982 | Iwata et al. | |
| 4,331,726 A | 5/1982 | Cleary | |
| 4,338,422 A | 7/1982 | Jackson, Jr. et al. | |
| 4,339,366 A | 7/1982 | Blount | |
| 4,340,681 A | 7/1982 | Reuter et al. | |
| 4,342,847 A | 8/1982 | Goyert et al. | |
| 4,344,873 A | 8/1982 | Wick | |
| 4,347,281 A | 8/1982 | Futcher et al. | |
| 4,359,359 A | 11/1982 | Gerlach et al. | |
| 4,359,548 A | 11/1982 | Blount | |
| 4,366,204 A | 12/1982 | Briggs | |
| 4,367,259 A | 1/1983 | Fulmer et al. | |
| 4,376,171 A | 3/1983 | Blount | |
| 4,381,352 A | 4/1983 | McBrayer | |
| 4,382,056 A | 5/1983 | Coonrod | |
| 4,383,818 A | 5/1983 | Swannell | |
| 4,390,581 A | 6/1983 | Cogswell et al. | |
| 4,395,214 A | 7/1983 | Phipps et al. | |
| 4,396,791 A | 8/1983 | Mazzoni | |
| 4,397,983 A | 8/1983 | Hill et al. | |
| 4,412,033 A | 10/1983 | LaBelle et al. | |
| 4,414,174 A | 11/1983 | Klempner et al. | |
| 4,439,548 A | 3/1984 | Weisman | |
| 4,450,133 A | 5/1984 | Cafarelli | |
| 4,454,251 A | 6/1984 | Frisch et al. | |
| 4,460,737 A | 7/1984 | Evans et al. | |
| 4,465,500 A | 8/1984 | Motsinger et al. | |
| 4,483,727 A | 11/1984 | Eickman et al. | |
| 4,489,023 A | 12/1984 | Proksa | |
| 4,512,942 A | 4/1985 | Babbin et al. | |
| 4,514,162 A | 4/1985 | Schulz | |
| 4,532,098 A | 7/1985 | Campbell et al. | |
| 4,540,357 A | 9/1985 | Campbell et al. | |
| 4,568,702 A | 2/1986 | Mascioli | |
| 4,576,718 A | 3/1986 | Reischl et al. | |
| 4,576,974 A | 3/1986 | Carroll et al. | |
| 4,581,186 A | 4/1986 | Larson | |
| 4,595,709 A | 6/1986 | Reischl | |
| 4,597,927 A | 7/1986 | Zeitler et al. | |
| 4,600,311 A | 7/1986 | Mourrier et al. | |
| 4,604,410 A | 8/1986 | Altenberg | |
| 4,649,162 A | 3/1987 | Roche et al. | |
| 4,661,533 A | 4/1987 | Stobby | |
| 4,677,157 A | 6/1987 | Jacobs | |
| 4,680,214 A * | 7/1987 | Frisch et al. | 428/107 |
| 4,714,778 A | 12/1987 | Burgoyne, Jr. et al. | |
| 4,717,027 A | 1/1988 | Laure et al. | |
| 4,724,250 A | 2/1988 | Schubert et al. | |
| 4,728,287 A | 3/1988 | Niems | |
| 4,728,288 A | 3/1988 | Niems | |
| 4,734,455 A | 3/1988 | Mobley et al. | |
| 4,737,524 A | 4/1988 | Ako et al. | |
| 4,780,484 A | 10/1988 | Schubert et al. | |
| 4,780,498 A | 10/1988 | Goerrissen et al. | |
| 4,795,763 A | 1/1989 | Gluck et al. | |
| 4,802,769 A | 2/1989 | Tanaka | |
| 4,826,429 A | 5/1989 | Niems | |
| 4,826,944 A | 5/1989 | Hoefer et al. | |
| 4,832,183 A | 5/1989 | Lapeyre | |
| 4,835,195 A | 5/1989 | Rayfield et al. | |
| 4,855,184 A | 8/1989 | Klun et al. | |
| 4,892,891 A | 1/1990 | Close | |
| 4,895,352 A | 1/1990 | Stumpf | |
| 4,948,859 A | 8/1990 | Echols et al. | |
| 4,995,801 A | 2/1991 | Hehl | |
| 5,001,165 A | 3/1991 | Canaday et al. | |
| 5,010,112 A | 4/1991 | Glicksman et al. | |
| 5,028,648 A | 7/1991 | Famili et al. | |
| 5,033,860 A | 7/1991 | Nakamura | |
| 5,051,222 A | 9/1991 | Marten et al. | |
| 5,053,274 A | 10/1991 | Jonas | |
| 5,064,293 A | 11/1991 | Nakamura | |
| 5,091,436 A | 2/1992 | Frisch et al. | |
| 5,094,798 A | 3/1992 | Hewitt | |
| 5,096,993 A | 3/1992 | Smith et al. | |
| 5,102,918 A | 4/1992 | Moriya | |
| 5,102,969 A | 4/1992 | Scheffler et al. | |
| 5,114,630 A | 5/1992 | Newman et al. | |
| 5,149,722 A | 9/1992 | Soukup | |
| 5,149,739 A | 9/1992 | Lee | |
| 5,159,012 A | 10/1992 | Doesburg et al. | |
| 5,166,301 A | 11/1992 | Jacobs | |
| 5,167,899 A | 12/1992 | Jezic | |
| 5,185,420 A | 2/1993 | Smith et al. | |
| 5,186,539 A | 2/1993 | Manser et al. | |
| 5,229,138 A | 7/1993 | Carotti | |
| 5,240,969 A | 8/1993 | Brown | |
| 5,252,697 A | 10/1993 | Jacobs et al. | |
| 5,271,699 A | 12/1993 | Barre et al. | |

(56) References Cited

U.S. PATENT DOCUMENTS

| | | |
|---|---|---|
| 5,278,195 A | 1/1994 | Volkert et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,453,231 A | 9/1995 | Douglas |
| 5,455,312 A | 10/1995 | Heidingsfeld et al. |
| 5,458,477 A | 10/1995 | Kemerer et al. |
| 5,458,831 A | 10/1995 | Saeki et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,514,430 A | 5/1996 | Andersen et al. |
| 5,522,446 A | 6/1996 | Mullet et al. |
| 5,527,172 A | 6/1996 | Graham, Jr. |
| 5,527,833 A | 6/1996 | Kuczynski et al. |
| 5,532,065 A | 7/1996 | Gubitz et al. |
| 5,536,781 A | 7/1996 | Heidingsfeld et al. |
| 5,554,713 A | 9/1996 | Freeland |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Brauer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Muller et al. |
| 5,700,495 A | 12/1997 | Kemerer et al. |
| 5,707,474 A | 1/1998 | Andersen et al. |
| 5,710,231 A | 1/1998 | Fogg et al. |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,769,281 A | 6/1998 | Bates |
| 5,782,283 A | 7/1998 | Kendall |
| 5,783,125 A | 7/1998 | Bastone et al. |
| 5,783,629 A | 7/1998 | Srinivasan et al. |
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,836,499 A | 11/1998 | Mullet et al. |
| 5,837,742 A | 11/1998 | Fishback |
| 5,844,015 A | 12/1998 | Steilen et al. |
| 5,872,168 A | 2/1999 | Katoot |
| 5,908,701 A | 6/1999 | Jennings et al. |
| 5,929,153 A | 7/1999 | Mori et al. |
| 5,932,337 A | 8/1999 | Edinger et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 5,993,551 A | 11/1999 | Hahn |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A * | 8/2000 | Petrovic et al. ............ 528/1 |
| 6,120,905 A | 9/2000 | Figovsky |
| 6,133,329 A | 10/2000 | Shieh et al. |
| 6,136,246 A | 10/2000 | Rauwendaal et al. |
| 6,136,870 A | 10/2000 | Triolo et al. |
| 6,140,381 A | 10/2000 | Rosthauser et al. |
| 6,146,556 A | 11/2000 | Katoot |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,228,933 B1 | 5/2001 | Hiles |
| 6,234,777 B1 | 5/2001 | Sperry et al. |
| 6,235,367 B1 | 5/2001 | Holmes et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,265,457 B1 | 7/2001 | Dolgopolsky et al. |
| 6,271,276 B1 | 8/2001 | Gribble et al. |
| 6,284,841 B1 | 9/2001 | Friesner |
| 6,294,637 B1 | 9/2001 | Brauer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,313,186 B1 | 11/2001 | Kaida et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,348,514 B1 | 2/2002 | Calabrese et al. |
| 6,383,599 B1 | 5/2002 | Bell et al. |
| 6,387,504 B1 | 5/2002 | Mushovic |
| 6,399,698 B1 | 6/2002 | Petrovic et al. |
| 6,409,949 B1 | 6/2002 | Tanaka et al. |
| 6,420,034 B1 | 7/2002 | Takahashi et al. |
| 6,423,755 B1 | 7/2002 | Allen et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,441,534 B2 | 8/2002 | Iino et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,486,224 B2 | 11/2002 | Lin et al. |
| 6,508,362 B2 | 1/2003 | Hnatow et al. |
| 6,524,978 B1 | 2/2003 | Moore |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |

(56) References Cited

U.S. PATENT DOCUMENTS

| | | |
|---|---|---|
| 6,604,848 B2 | 8/2003 | Tanaka et al. |
| 6,605,343 B1 | 8/2003 | Motoi et al. |
| 6,609,638 B1 | 8/2003 | Lott |
| 6,610,756 B1 | 8/2003 | Shimizu et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,646,093 B2 | 11/2003 | Tsuruta et al. |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Muzenberger et al. |
| 6,709,717 B2 | 3/2004 | Mushovic |
| 6,767,399 B2 | 7/2004 | Peev et al. |
| 6,769,220 B2 | 8/2004 | Friesner |
| 6,777,457 B2 | 8/2004 | Dolgopolsky et al. |
| 6,832,430 B1 | 12/2004 | Ogawa et al. |
| 6,849,676 B1 | 2/2005 | Shibano et al. |
| 6,864,296 B2 | 3/2005 | Kurth |
| 6,864,312 B2 | 3/2005 | Moore |
| 6,867,239 B2 | 3/2005 | Kurth |
| 6,871,457 B2 | 3/2005 | Quintero-Flores et al. |
| 6,881,763 B2 | 4/2005 | Kurth |
| 6,881,764 B2 | 4/2005 | Doesburg et al. |
| 6,903,156 B2 | 6/2005 | Muller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,972,144 B2 | 12/2005 | Roth et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,037,865 B1 | 5/2006 | Kimberly |
| 7,063,877 B2 | 6/2006 | Kurth et al. |
| 7,098,291 B2 | 8/2006 | Brinkman |
| 7,132,459 B1 | 11/2006 | Buchel |
| 7,160,976 B2 | 1/2007 | Luhmann et al. |
| 7,188,992 B2 | 3/2007 | Mattingly, Jr. |
| 7,196,124 B2 | 3/2007 | Parker et al. |
| 7,199,168 B2 | 4/2007 | Spitler et al. |
| 7,211,206 B2 | 5/2007 | Brown et al. |
| 7,241,818 B2 | 7/2007 | Hemmings et al. |
| 7,267,288 B2 | 9/2007 | Wheeler, Jr. et al. |
| 7,316,559 B2 | 1/2008 | Taylor |
| 7,491,351 B2 | 2/2009 | Taylor et al. |
| 7,651,645 B2 | 1/2010 | Taylor |
| 7,763,341 B2 | 7/2010 | Brown |
| 7,794,224 B2 | 9/2010 | Butteriss |
| 7,794,817 B2 | 9/2010 | Brown |
| 2001/0009683 A1 | 7/2001 | Kitahama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0065045 A1 | 4/2003 | Falke et al. |
| 2003/0080203 A1 | 5/2003 | Roth et al. |
| 2003/0083394 A1 | 5/2003 | Clatty |
| 2003/0090016 A1* | 5/2003 | Petrovic et al. .................. 264/31 |
| 2003/0134920 A1 | 7/2003 | Poisl et al. |
| 2003/0143910 A1 | 7/2003 | Mashburn et al. |
| 2003/0158365 A1 | 8/2003 | Brauer et al. |
| 2003/0232933 A1 | 12/2003 | Lagneaux et al. |
| 2003/0232956 A1 | 12/2003 | Brinkman |
| 2004/0048055 A1 | 3/2004 | Branca |
| 2004/0049002 A1 | 3/2004 | Andrews et al. |
| 2004/0115415 A1 | 6/2004 | Thiele et al. |
| 2004/0121161 A1 | 6/2004 | Shugert et al. |
| 2004/0132903 A1 | 7/2004 | Doesburg |
| 2004/0144287 A1 | 7/2004 | Tardif et al. |
| 2004/0147627 A1 | 7/2004 | Hager et al. |
| 2004/0176486 A1 | 9/2004 | Glorioso et al. |
| 2004/0198900 A1 | 10/2004 | Madaj |
| 2004/0266993 A1 | 12/2004 | Evans |
| 2005/0011159 A1 | 1/2005 | Standal et al. |
| 2005/0031578 A1 | 2/2005 | Deslauriers et al. |
| 2005/0070620 A1 | 3/2005 | Herrington et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0136259 A1 | 6/2005 | Mohanty et al. |
| 2005/0161855 A1 | 7/2005 | Brown et al. |
| 2005/0163969 A1 | 7/2005 | Brown |
| 2005/0171243 A1 | 8/2005 | Hemmings et al. |
| 2005/0173830 A1 | 8/2005 | Thiele et al. |
| 2005/0182228 A1 | 8/2005 | Kurth |
| 2005/0208167 A1 | 9/2005 | You et al. |
| 2005/0222303 A1 | 10/2005 | Cernohous |
| 2005/0260351 A1 | 11/2005 | Kurth et al. |
| 2005/0281999 A1 | 12/2005 | Hofmann et al. |
| 2005/0287238 A1 | 12/2005 | Taylor |
| 2006/0003042 A1 | 1/2006 | Inoue et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani |
| 2006/0071369 A1 | 4/2006 | Butteriss |
| 2006/0105145 A1 | 5/2006 | Brown |
| 2006/0115625 A1 | 6/2006 | Brown |
| 2006/0186571 A1 | 8/2006 | Brown |
| 2006/0186572 A1 | 8/2006 | Brown |
| 2006/0217517 A1 | 9/2006 | Daly |
| 2006/0251881 A1 | 11/2006 | Gilder |
| 2006/0269738 A1 | 11/2006 | Kimberly |
| 2006/0270747 A1 | 11/2006 | Griggs |
| 2006/0273486 A1 | 12/2006 | Taylor |
| 2006/0276609 A1 | 12/2006 | Lysenko et al. |
| 2006/0293428 A1 | 12/2006 | Singh et al. |
| 2007/0026142 A1 | 2/2007 | Singh et al. |
| 2007/0027227 A1 | 2/2007 | Shutov |
| 2007/0036975 A1 | 2/2007 | Miele et al. |
| 2007/0037953 A1 | 2/2007 | Geiger et al. |
| 2007/0052128 A1 | 3/2007 | Taylor |
| 2007/0056875 A1 | 3/2007 | Hlady et al. |
| 2007/0066697 A1 | 3/2007 | Gilder et al. |
| 2007/0083003 A1 | 4/2007 | Gupta |
| 2007/0155863 A1 | 7/2007 | Mohanty et al. |
| 2007/0213456 A1 | 9/2007 | Singh et al. |
| 2007/0222105 A1* | 9/2007 | Brown ......................... 264/211 |
| 2007/0222106 A1 | 9/2007 | Brown |
| 2007/0225391 A1 | 9/2007 | Brown |
| 2007/0225419 A1 | 9/2007 | Brown |
| 2007/0275227 A1 | 11/2007 | Mashburn et al. |
| 2008/0029925 A1 | 2/2008 | Brown |
| 2008/0114086 A1 | 5/2008 | Lorenz et al. |
| 2008/0132611 A1 | 6/2008 | Brown |
| 2008/0237914 A1 | 10/2008 | Lustiger et al. |
| 2009/0011671 A1* | 1/2009 | Doesburg et al. .............. 442/104 |
| 2009/0110869 A1 | 4/2009 | Streeton et al. |
| 2009/0198036 A1 | 8/2009 | Duffy |
| 2009/0295021 A1* | 12/2009 | Brown .................... 264/211.24 |
| 2010/0025882 A1 | 2/2010 | Taylor et al. |
| 2010/0201014 A1 | 8/2010 | Taylor |
| 2010/0230852 A1 | 9/2010 | Brown |
| 2010/0240785 A1 | 9/2010 | Hickey et al. |
| 2010/0264559 A1 | 10/2010 | Brown |

(56) References Cited

U.S. PATENT DOCUMENTS

| | | |
|---|---|---|
| 2010/0292397 A1 | 11/2010 | Brown |
| 2010/0296361 A1 | 11/2010 | Brown |
| 2011/0002190 A1 | 1/2011 | Tardif |

FOREIGN PATENT DOCUMENTS

| | | |
|---|---|---|
| CN | 1052991 | 5/2000 |
| CN | 1926282 | 3/2007 |
| DE | 2351844 | 4/1975 |
| DE | 2713984 | 10/1978 |
| DE | 2714006 | 10/1978 |
| DE | 2740504 | 3/1979 |
| DE | 3839986 | 5/1990 |
| DE | 19528938 | 2/1997 |
| DE | 102006021266 | 11/2006 |
| DE | 102008063815 | 6/2010 |
| DE | 202008016807 | 6/2010 |
| EP | 0654297 | 5/1995 |
| EP | 0771827 | 5/1997 |
| EP | 0911453 | 4/1999 |
| EP | 1 336 461 | 5/2002 |
| EP | 1201703 | 5/2002 |
| EP | 1921098 | 5/2008 |
| EP | 1921099 | 5/2008 |
| EP | 1927535 | 6/2008 |
| GB | 790527 | 2/1958 |
| GB | 1152306 | 5/1969 |
| GB | 1246940 | 9/1971 |
| GB | 1314707 | 4/1973 |
| GB | 2300627 | 11/1996 |
| GB | 2306909 | 5/1997 |
| GB | 2347933 | 9/2000 |
| JP | 355080456 | 6/1980 |
| JP | 56007637 | 1/1981 |
| JP | 58132533 | 8/1983 |
| JP | 60002329 | 1/1985 |
| JP | 61081757 | 4/1986 |
| JP | 61209124 | 9/1986 |
| JP | 63-22819 | 1/1988 |
| JP | 63022819 | 1/1988 |
| JP | 63202408 | 8/1988 |
| JP | 4037506 | 2/1992 |
| JP | 5237913 | 9/1993 |
| JP | 5237914 | 9/1993 |
| JP | 5261796 | 10/1993 |
| JP | 05285941 | 11/1993 |
| JP | 6001252 | 1/1994 |
| JP | 6129742 | 5/1994 |
| JP | 6261669 | 9/1994 |
| JP | 07076395 | 3/1995 |
| JP | 07313941 | 12/1995 |
| JP | 08188634 | 7/1996 |
| JP | 11005245 | 1/1999 |
| JP | 11171960 | 6/1999 |
| JP | 2001326361 | 11/2001 |
| JP | 2004131654 | 4/2004 |
| JP | 2005138567 | 6/2005 |
| KR | 2002086327 | 11/2002 |
| NZ | 226301 | 3/1990 |
| WO | 81/03026 | 10/1981 |
| WO | 87/05541 | 9/1987 |
| WO | 91/00304 | 1/1991 |
| WO | 92/07892 | 5/1992 |
| WO | 93/19110 | 9/1993 |
| WO | 93/24549 | 12/1993 |
| WO | 94/25529 | 11/1994 |
| WO | 94/27697 | 12/1994 |
| WO | 95/18185 | 7/1995 |
| WO | 97/11114 | 3/1997 |
| WO | 97/44373 | 11/1997 |
| WO | 98/08893 | 3/1998 |
| WO | 99/37592 | 7/1999 |
| WO | 99/39891 | 8/1999 |
| WO | 00/04082 | 1/2000 |
| WO | 00/17249 | 3/2000 |
| WO | 00/64993 | 11/2000 |
| WO | 01/72863 | 10/2001 |
| WO | 01/94470 | 12/2001 |
| WO | 02/01530 | 1/2002 |
| WO | 2004/065469 | 8/2004 |
| WO | 2004/078900 | 9/2004 |
| WO | 2004/113248 | 12/2004 |
| WO | 2005/006349 | 1/2005 |
| WO | 2005/053938 | 6/2005 |
| WO | 2005/056267 | 6/2005 |
| WO | 2005/072187 | 8/2005 |
| WO | 2005/072188 | 8/2005 |
| WO | 2005/094255 | 10/2005 |
| WO | 2005/123798 | 12/2005 |
| WO | 2006/012149 | 2/2006 |
| WO | 2006/114430 | 2/2006 |
| WO | 2006/118995 | 11/2006 |
| WO | 2006/137672 | 12/2006 |
| WO | 2007/014332 | 2/2007 |
| WO | 2007/087175 | 8/2007 |
| WO | 2007/112104 | 10/2007 |
| WO | 2007/112105 | 10/2007 |
| WO | 2008/110222 | 9/2008 |
| WO | 2008/127934 | 10/2008 |
| WO | 2008/154010 | 12/2008 |
| WO | 2009/045926 | 4/2009 |
| WO | 2009/048927 | 4/2009 |
| WO | 2010/078895 | 7/2010 |

OTHER PUBLICATIONS

Morimoto et al., "Continuous Glass Fiber Reinforced Rigid Polyurethane Foam (Airlite FRU)," Internatinoal Progress in Urethanes, vol. 5, Lancaster, PA, Technomic Publishing Co., Inc., 1988.

Okagawa et al., "Glass Fibre Reinforced Rigid Polyurethane Foam," Cellular and non cellular polyurethanes, Carl Hanser Verlag Munchen Wien Druck und Bindung, Germany, p. 453-467, 1980.

Okagawa, F., "Glass Fiber Reinforced Rigid Polyurethane Foam", International Progress in Urethane, vol. 2, Lancaster, PA, Technomic Publishing Co., Inc., 1980.

"Soya-based isocyanate alternatives coming? (us newslines)," Urethanes Technology, Apr. 1, 2007, abstract.

Guhanathan, S. et al., "Studies on Castor Oil-based Polyurethane/Polyacrylonitrile Interpenetrating Polymer Network for Toughening of Unsaturated Polyester Resin," Journal of Applied Polymer Science, 92:817-829 (2004).

Javni, I. et al., "Thermal Stability of Polyurethanes Based on Vegetable Oils," Journal of Applied Polymer Science, 77:1723-1734 (2000).

Nayak, P.L., "Natural Oil-Based Polymers: Opportunities and Challenges," J. Macro. Sci. Rev. Macro. Chem. & Phys., C40(1):1-21 (2000).

International Search Report and Written Opinion, mailed Nov. 12, 2010 in the co-pending related International Application No. PCT/US2010/045454, 12 pages.

Co-pending related U.S. Appl. No. 12/855,382, filed Aug. 12, 2010.
Co-pending, related U.S. Appl. No. 12/855,372, filed Aug. 12, 2010.
Co-pending, related U.S. Appl. No. 12/855,368, filed Aug. 12, 2010.

Anonymous. "Rigid polyurethane foams having a strut/window mass ratio in the range of 90/10 to 10/90, made via extrusion." Research Disclosure. Journal No. 40264, Published Oct. 1997.

Anonymous. "Cellular plastics made by extrusion." Research Disclosure. Journal No. 40204, Published Oct. 1997.

Szycher, Michael. 17.7.1 Foam Production by Extruder Method. Szycher's Handbook of Polyurethanes. pp. 17-21-17-22. Copyright 1999 by CRC Press LLC.

Standard Practice for Polyurethane Raw Materials: Polyurethane Foam Cup Test, ASTM D7487-08, 2008.

International Preliminary Report on Patentability, mailed Oct. 11, 2011 in the co-pending related International Application No. PCT/US2010/045454, 7 pages.

Oertel; Polyurethane Handbook—Chemistry—Raw materials Processing—Application—Properties; Hanser Publishers; New York; 1985 pp. 16-18.

Szycher, Michael; Szycher's Handbook of Polyurethanes; CRC Press. New York; pp. 7-16-7-21.

* cited by examiner

FILLED POLYURETHANE COMPOSITES AND METHODS OF MAKING SAME

CROSS-REFERENCE TO RELATED APPLICATIONS

This application claims priority to U.S. Provisional Application No. 61/233,984, filed Aug. 14, 2009, which is incorporated herein by reference in its entirety.

BACKGROUND

Polymeric composite materials that contain organic or inorganic filler materials have become desirable for a variety of uses because of their excellent mechanical properties and weathering stability. Foamed versions of these materials can be relatively low density yet the filler materials can provide a composite material that is extremely strong. The polymer provided in the composite material can help provide good toughness (i.e., resistance to brittle fracture) and resistance to degradation from weathering to the composite when it is exposed to the environment. Thus, polymeric composite materials including organic or inorganic fillers can be used in a variety of applications.

SUMMARY

Composite materials and methods for their preparation are described. The composite materials include a polyurethane formed by the reaction of an isocyanate and a polyol, and coal ash. The coal ash can be, for example, fly ash. The isocyanates used in these composites are selected from the group consisting of diisocyanates, polyisocyanates and mixtures thereof. The polyols used in these composites include at least two polyols, the at least two polyols including a high hydroxyl number polyol selected from the group consisting of polyether polyols and polyester polyols, the high hydroxyl number polyol having a hydroxyl number greater than 250 and comprising from about 1% to about 25% by weight of the total polyol content used to form the polyurethane, and a low hydroxyl number polyol selected from the group consisting of polyether polyols and polyester polyols, the low hydroxyl number polyol having a hydroxyl number of 250 or lower. The fly ash is present in amounts from about 40% to about 90% by weight of the composite material.

Also described is a method of preparing a composite material, which includes mixing an isocyanate selected from the group consisting of diisocyanates, polyisocyanates, and mixtures thereof; at least two polyols wherein the at least two polyols include (i) a high hydroxyl number polyol selected from the group consisting of polyether polyols and polyester polyols and having a first hydroxyl number greater than 250, said high hydroxyl number polyol comprising from about 1% to about 25% by weight of the total polyol content used to form the polyurethane, and (ii) a lower hydroxyl number polyol selected from the group consisting of polyether polyols and polyester polyols, said lower hydroxyl number polyol having a hydroxyl number of 250 or lower; coal ash; and a catalyst. The coal ash can be, for example, fly ash. The isocyanate and the at least two polyols react in the presence of the coal ash and catalyst to form the composite material. The amount of coal ash (e.g., fly ash) added in the mixing step is from about 40% to about 90% by weight of the composite material.

DETAILED DESCRIPTION

Composite materials and methods for their preparation are described herein. The composite materials include a polyurethane formed by the reaction of an isocyanate, selected from the group consisting of diisocyanates, polyisocyanates, and mixtures thereof, and at least two polyols. The at least two polyols include a high hydroxyl number polyol and a low hydroxyl number polyol and can be selected from polyether polyols and polyester polyols. The high hydroxyl number polyol has a hydroxyl number greater than 250 and is from about 1% to about 25% by weight of the total polyol content used to form the polyurethane. The low hydroxyl number polyol has a hydroxyl number of 250 or lower. Coal ash (e.g., fly ash) is present in the composite materials in amounts from about 40% to about 90% by weight of the composite material.

The composite materials described herein as well as their polyurethane component can be formulated with a high total environmental content. As used herein, the term total environmental content refers to the sum of the total renewable content and the total recyclable content used to form a composite material or its polyurethane component and is expressed as a weight percent. As used herein, renewable content refers to matter that is provided by natural processes or sources. Examples of renewable content include alcohol and oils from plants, such as castor oil and soybean oil. Isocyanates derived from natural oil, such as castor oil pre-polymers and soybean oil pre-polymers, are also examples of renewable content. As used herein, recyclable content includes content that is derived from materials that would otherwise have been discarded. Examples of recyclable content include a recyclable polyol (e.g., one derived from recyclable polyester), glycerin sourced from a biodiesel plant, and a coal ash. Renewable content and recyclable content are used in the composites described herein to produce composite materials and polyurethane components with a high total environmental content.

The total environmental content of the polyurethane component (based only on the polyols and isocyanates) of the composite materials described herein can be greater than 35%. Further, the total environmental content of the polyurethane components described herein can be greater than 40% or greater than 45%. Examples of the total environmental content of the polyurethane components include environmental content greater than 36%, greater than 37%, greater than 38%, greater than 39%, greater than 41%, greater than 42%, greater than 43%, and greater than 44%. Additionally, the total environmental content of the polyurethane components can be about 36%, about 37%, about 38%, about 39%, about 40%, about 41%, about 42%, about 43%, about 44%, about 45%, about 46%, about 47%, about 48%, about 49%, or about 50%. As used herein, the term about is intended to capture the range of experimental error (e.g., ±1%) associated with making the specified measurement. Unless otherwise noted, all percentages and parts are by weight.

The total environmental content of the composite materials described herein can be greater than 75%. Further, the total environmental content of the composite materials described herein can be greater than 80% or greater than 85%. Examples of the total environmental content of the composite materials include total environmental content greater than 76%, greater than 77%, greater than 78%, greater than 79%, greater than 81%, greater than 82%, greater than 83%, and greater than 84%. Additionally, the total environmental content of the composite materials can be about 75%, about 76%, about 77%, about 78%, about 79%, about 80%, about 81%, about 82%, about 83%, about 84%, about 85%, about 86%, about 87%, about 88%, about 89%, or about 90%.

Polyurethanes useful with the composite materials described herein include those formed by the reaction of one or more monomeric, oligomeric poly- or di-isocyanates, or mixtures of these (sometimes referred to as isocyanates) and at least two polyols, the at least two polyols including a high hydroxyl number polyol and a low hydroxyl number polyol (both selected from the group consisting of polyether polyols and polyester polyols). The high hydroxyl number polyol has a hydroxyl number greater than 250 and is present in amounts from about 1% to about 25% by weight of the total polyol content used to form the polyurethane. The low hydroxyl number polyol has a hydroxyl number of 250 or lower and is present in amounts from about 75% to about 99% by weight of the total polyol content used to form the polyurethane.

The high hydroxyl number polyol and/or the low hydroxyl number polyol can be a plant-based polyol and thus increase the environmental content of the polyurethane component and thus the composite material. The plant-based polyols can include polyols containing ester groups that are derived from plant-based fats and oils and can contain structural elements of fatty acids and fatty alcohols. Starting materials for the plant-based polyols of the polyurethane component include fats and/or oils of plant-based origin with preferably unsaturated fatty acid residues. For example, the plant-based polyols can be or can be derived from castor oil, coconut oil, corn oil, cottonseed oil, lesquerella oil, linseed oil, olive oil, palm oil, palm kernel oil, peanut oil, sunflower oil, tall oil, or mixtures thereof.

The high hydroxyl number polyol (whether a single polyol or mixture of high hydroxyl number polyols) can be present in an amount from about 1% to about 25%, about 1% to about 20%, about 1% to about 15%, about 1% to about 10%, or about 1% to about 5%. Examples of the weight percent of the high hydroxyl number in the mixtures include about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, and about 25%. The low hydroxyl number polyol (whether a single polyol or mixture of low hydroxyl number polyols) can be, for example, from about 75% to about 99%, about 80% to about 99%, about 85% to about 99%, about 90% to about 99%, or about 95% to about 99% by weight of the total polyol content. For further example, the percentages of the low hydroxyl number polyol by weight of the total polyol can be about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99%. For example, the high hydroxyl number can be present in 15% by weight of the total polyol and the low hydroxyl number can be present in 85% by weight of the total polyol.

As indicated above, the high hydroxyl number polyol useful in the composite materials described herein has a hydroxyl number greater than 250. Examples of the high hydroxyl number polyol include hydroxyl numbers greater than 255, greater than 260, greater than 265, greater than 270, greater than 275, greater than 280, greater than 285, greater than 290, greater than 295, greater than 300, greater than 325, greater than 350, greater than 375, greater than 400, greater than 450, greater than 500, greater than 550, greater than 600, greater than 650, greater than 700, greater than 750, greater than 800, greater than 850, greater than 900, greater than 950, greater than 1000, greater than 1100, greater than 1200, greater than 1300, greater than 1400, greater than 1500, greater than 1600, greater than 1700, greater than 1800, greater than 1900, and greater than 2000. The high hydroxyl number polyols can have an average functionality of about 2.0 to about 8.0, about 2.2 to about 6.0, about 2.3 to about 5.0, about 2.4 to about 4.0, or about 2.5 to about 3.5.

Exemplary high hydroxyl number polyols include, for example, glycerin and other polyols typically considered chain extenders or cross-linking agents such as ethylene glycol, 1,4-butanediol, trimethylolpropane, and sorbitol. The high hydroxyl number polyols can include highly reactive polyols such as highly reactive soybean oil based polyols. In some embodiments, the highly reactive polyols can include a large number of primary hydroxyl groups (e.g. 75% or more or 80% or more) as determined using fluorine NMR spectroscopy as described in ASTM D4273 [34]. Suitable highly reactive polyols can produce a Brookfield viscosity rise to a Brookfield viscosity of over 50,000 cP in less than 225 seconds, or less than 200 seconds when used in a standard Brookfield Viscosity Test procedure. In the standard Brookfield Viscosity Test procedure, the polyol is provided in an amount of 100 parts by weight and mixed with DC-197 surfactant (1.0 parts by weight), DABCO R-8020 catalyst (2.0 parts by weight), fly ash (460.0 parts by weight) and water (0.5 parts by weight) in a 600 mL glass jar at 1000 RPM for 30 seconds using any lab-duty electric stirrer equipped with a Jiffy Mixer brand, Model LM, mixing blade. MONDUR MR Light (a polymeric MDI, having a NCO weight of 31.5%, viscosity of 200 mPa·s @ 25° C., equivalent weight of 133, and a functionality of 2.8) is then added at an isocyanate index of 110 and the components mixed for an additional 30 seconds. The glass jar is then removed from the stirrer and placed on a Brookfield viscometer. The viscosity rise is measured using a for 20 minutes or until 50,000 cP is reached. The Brookfield Viscosity Test is described, for example, in Polyurethane Handbook: Chemistry, Raw Materials, Processing Application, Properties, 2nd Edition, Ed: Gunter Oertel; Hanser/Gardner Publications, Inc., Cincinnati, Ohio; Rigid Plastic Foams, T. H. Ferrigno (1963); and Reaction Polymers: Polyurethanes, Epoxies, Unsaturated Polyesters, Phenolics, Special Monomers and Additives: Chemistry, Technology, Applications, Wilson F. Gum et al. (1992), which are all herein incorporated by reference. In some embodiments, the highly reactive polyol can have a primary hydroxyl number, defined as the hydroxyl number multiplied by the percentage of primary hydroxyl groups based on the total number of hydroxyl groups, of greater than 250. Exemplary highly reactive polyols include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Honey Bee HB-530, a soybean oil-based polyol commercially available from MCPU Polymer Engineering; Stepanpol PD-110 LV and PS 2352, polyols based on soybean oil, diethylene glycol and phthallic anhydride and commercially available from Stepan Company; and derivatives thereof. In some embodiments, the highly reactive polyols can be formed by the reaction of a soybean oil and a polyester to produce a plant-based polyester polyol. An example of such a soybean oil-based polyester polyol is Ecopol 131, which is a highly reactive aromatic polyester polyol comprising 80% primary hydroxyl groups. Polyester polyols can be prepared using recyclable polyester to further increase the recyclable content of a composite material and Ecopol 131 is an example of such a polyester polyol. In some embodiments, the soybean oil and polyester based polyol can be prepared using recycled polyester. Further examples of high hydroxyl number polyols include Voranol 225, 360, 480, RN 490, RA 640, RA 800, 230-660 and WR2000, polyether polyols commercially available from Dow Chemical Company (Midland, Mich.); Multranol 4011, 4012 and 4050 and Arcol LG-56 and LG-650, commercially available from Bayer; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes (Auburn Hills, Mich.); Jeffol SG 360, a sucrose and glycerin-based polyol commercially available from Huntsman Polyurethanes; and derivatives thereof. In some embodiments, the high hydroxyl number polyol can include renewable and recyclable content. The high hydroxyl number polyol can also be composed of a blend of high hydroxyl number polyols (e.g. a blend of glycerin and Ecopol 131).

The low hydroxyl number polyol has a hydroxyl number of 250 or lower. Examples of the low hydroxyl number polyol include hydroxyl numbers lower than 245, lower than 240, lower than 235, lower than 230, lower than 225, lower than 220, lower than 215, lower than 210, lower than 205, lower than 200, lower than 195, lower than 190, lower than 185, lower than 180, lower than 175, lower than 150, lower than 125, or lower than 100. The low hydroxyl number polyols can have an average functionality of about 1.0 to about 4.0, about 1.5 to about 3.5, about 1.8 to about 3.4, or about 2.0 to about 3.0.

Exemplary low hydroxyl number polyols include castor oil and lesquerella oil. Castor oil is a well-known, commercially available material, and is described, for example, in Encyclopedia of Chemical Technology, Volume 5, John Wiley & Sons (1979). Suitable castor oils include those sold by Vertellus Specialties, Inc., e.g., DB® Oil, which has a hydroxyl number of about 166, and Eagle Specialty Products, e.g., T31® Oil, which has a hydroxyl number of about 160. Other exemplary low hydroxyl number polyols that provide additional environmental content include Ecopol 123 and Ecopol 124, which are commercially available from Ecopur Industries; Agrol 2.0, 3.6, 4.3, 5.6 and 7.0, vegetable oil based polyols commercially available from BioBased Technologies; Honey Bee HB-150 and HB-230, soybean oil-based polyols commercially available from MCPU Polymer Engineering; and Terol 1154, commercially available from Oxid (Houston, Tex.). Other low hydroxyl number polyols can also be used such as Multranol 3900, Multranol 3901, Arcol 11-34, Arcol 24-32, Arcol 31-28, Arcol E-351, Arcol LHT-42, and Arcol LHT-112, commercially available from Bayer; Voranol 220-028, 220-094, 220-110N, 222-056, 232-027, 232-034, and 232-035, commercially available from Dow; and derivatives thereof. The low hydroxyl number polyol can also be composed of a blend of polyols. For example, the low hydroxyl number polyol can be a blend of castor oil and another low hydroxyl number polyol.

In some embodiments, a polyol system useful with the composite materials described herein can include 1-25% of glycerin (hydroxyl number: 1829 mg KOH/g), Ecopol 131 (hydroxyl number: 360-380 mg KOH/g), or a mixture thereof; and 75-99% castor oil (hydroxyl number: about 166 mg KOH/g).

Isocyanates useful with the composite materials described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates (e.g., castor oil pre-polymer isocyanates and soy polyol pre-polymer isocyanates). An example of a useful diisocyanate is methylene diphenyl diisocyanate (MDI). Useful MDIs include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, $2^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include Mondur MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates or combinations of isocyanates useful with the composites described herein is between about 1.5 to about 5. Further, examples of useful isocyanates include isocyanates with an average functionality of about 2 to 4.5, about 2.2 to about 4.0, about 2.4 to about 3.7, about 2.6 to about 3.4, and about 2.8 to about 3.2.

In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

As described above, the composite materials described herein include a polyurethane formed by the reaction of an isocyanate and at least two polyols in the presence of coal ash. The coal ash can be fly ash, bottom ash, or combinations thereof. In some examples, the coal ash used is fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants are suitable for incorporation in composites described herein.

Coal ash is present in the composites described herein in amounts from about 40% to about 90% by weight. Further, coal ash can be present in amounts from about 60% to about 85%. Examples of the amount of coal ash present in the composites described herein include about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90%.

One or more additional fillers can be used in the composite materials described herein. Examples of fillers useful with the composite materials include other types of ash such as those produced by firing fuels including industrial gases, petroleum coke, petroleum products, municipal solid waste, paper sludge, wood, sawdust, refuse derived fuels, switchgrass, or other biomass material. The one or more additional fillers can also include ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

In some embodiments, inorganic fibers or organic fibers can be included in the polymer composite, e.g., to provide increased strength, stiffness or toughness. Fibers suitable for use with the composite materials described herein can be provided in the form of individual fibers, fabrics, rovings, or tows. These can be added prior to polymerization and can be chopped before or during the mixing process to provide desired fiber lengths. Alternately, the fibers can be added after polymerization, for example, after the composite material exits the mixing apparatus. The fibers can be up to about 2 in. in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of fillers in the composite materials as described herein can modify and/or improve the chemical and mechanical properties of the composite materials. For example, the optimization of various properties of the composite materials allows their use in building materials and other structural applications. High filler loading levels can be used in composite materials without a substantial reduction of (and potentially an improvement in) the intrinsic structural, physical, and mechanical properties of a composite.

The use of filled composites as building materials has advantages over composite materials made using lower filler levels or no filler. For example, the use of higher filler loading levels in building materials may allow the building materials to be produced at a substantially decreased cost. The use of large filler loadings also provides environmental advantages. For example, the incorporation of recyclable or renewable material, e.g., fly ash, as filler, provides a composite material with a higher percentage of environmentally friendly materials, i.e., a higher total environmental content. The use of the environmentally friendly materials in these composites decreases the need of landfills and other waste facilities to store such material. Another environmental benefit of using recyclable or renewable materials as filler in these composites includes reducing the production of virgin fillers that may involve energy-intensive methods for their creation and may produce waste or by-product materials.

One or more catalysts are added to facilitate curing and can be used to control the curing time of the polymer matrix. Examples of useful catalysts include amine-containing catalysts (such as DABCO and tetramethylbutanediamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used.

Additional components useful with the composite materials described herein include foaming agents, blowing agents, surfactants, chain-extenders, crosslinkers, coupling agents, UV stabilizers, fire retardants, antimicrobials, anti-oxidants, and pigments. Though the use of such components is well known to those of skill in the art, some of these additional additives are further described herein.

Foaming agents and blowing agents may be added to the composite materials described herein to produce a foamed version of the composite materials. Examples of blowing agents include organic blowing agents, such as halogenated hydrocarbons, acetone, hexanes, and other materials that have a boiling point below the reaction temperature. Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as DC-197 and DC-193 (Air Products; Allentown, Pa.) can be used.

The addition of excess foaming or blowing agents above what is needed to complete the foaming reaction can add strength and stiffness to the composite material, improve the water resistance of the composite material, and increase the thickness and durability of the outer skin of the composite material. Such excessive blowing agent may produce a vigorously foaming reaction product. To contain the reaction product, a forming device that contains the pressure or restrains the materials from expanding beyond the design limits may be used, such as a stationary or continuous mold.

Low molecular weight reactants such as chain-extenders and/or crosslinkers can be included in the composite materials described herein. These reactants help the polyurethane system to distribute and contain the inorganic filler and/or fibers within the composite material. Chain-extenders are difunctional molecules, such as diamines, that can polymerize to lengthen the urethane polymer chains. Examples of diamine chain-extenders include ethylene diamine, 4,4'-methylenebis(2-chloroaniline) (MBOCA), diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of amine-based crosslinkers include diethanolamine and triethanolamine.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of an inorganic filler such as fly ash and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

Examples of compositions illustrating aspects of the composites as described herein are shown in Tables 1-3. Exemplary ingredients for a first fly ash filled composite material (Composite 1) are shown in Table 1. In Composite 1, fly ash filler and glycerin both have recyclable content, and castor oil has renewable content. The surfactants, catalysts, water, and glass fibers are not generally considered to have renewable or recyclable content. The use of castor oil as the polyol provides a polyurethane component of the composite (based only on the polyols and isocyanates) with a total environmental content of 41.66 wt %, and the total environmental content for Composite 1 is 79.84%.

TABLE 1

Composite 1

| Ingredient | Units | Renewable Content, % | Renewable Content Units | Recyclable Units |
|---|---|---|---|---|
| Fly ash | 711.38 | 0 | — | 711.38 |
| Castor Oil | 85.00 | 100 | 85.00 | — |
| Glycerin | 15.00 | 0 | — | 15.00 |
| Surfactant | 1.00 | 0 | — | — |
| Catalyst | 1.00 | 0 | — | — |
| Water | 1.80 | 0 | — | — |
| Fiber | 60.97 | 0 | — | — |
| Isocyanate | 140.04 | 0 | — | — |
| Delayed catalyst | 0.06 | 0 | — | — |
| Total Units | 1016.25 | | | |
| Total Renewable Units | — | — | 85.00 | — |
| Total Recyclable Units | — | — | — | 726.38 |

TABLE 1-continued

Composite 1

| Ingredient | Units | Renewable Content, % | Renewable Content Units | Recyclable Units |
|---|---|---|---|---|
| % Fly Ash | 70.00 | | | |
| % Renewable Content | 8.36 | | | |
| % Recyclable Content | 71.48 | | | |
| Total Environmental Content | 79.84 | | | |

Exemplary ingredients for a second fly ash filled composite material (Composite 2) are shown in Table 2. Composite 2 includes Ecopol 131, which is understood from the product literature to include 40% soybean oil (renewable content) and 40% recycled polyester (recyclable content). In Composite 2, the fly ash filler contains recyclable content, and castor oil has renewable content. In this example, surfactants, catalysts, water, and glass fibers are not considered to contain renewable or recyclable content. The use of castor oil as the polyol provides a polyurethane component of the composite with a total environmental content of 38.97 wt %, and the total environmental content for Composite 2 is 79.19%.

TABLE 2

Composite 2

| Ingredient | Units | Renewable Content, % | Renewable Content Units | Recyclable Units |
|---|---|---|---|---|
| Fly ash | 639.54 | 0 | — | 639.54 |
| Castor Oil | 20.00 | 100 | 20.00 | — |
| Ecopol 131 | 80.00 | 40 | 32.00 | 32.00 |
| Surfactant | 1.00 | 0 | — | — |
| Catalyst | 1.00 | 0 | — | — |
| Water | 1.70 | 0 | — | — |
| Fiber | 54.82 | 0 | — | — |
| Isocyanate | 115.55 | 0 | — | — |
| Delayed catalyst | 0.02 | 0 | — | — |
| Total Units | 913.63 | | | |
| Total Renewable Content Units | — | — | 52.00 | — |
| Total Recyclable Units | — | — | — | 671.54 |
| % Fly Ash | 70.00 | | | |
| % Renewable-Content | 5.69 | | | |
| % Recyclable Content | 73.50 | | | |
| Total Environmental Content | 79.19 | | | |

Exemplary ingredients for a third fly ash filled composite material (Composite 3) are shown in Table 3. In Composite 3, fly ash filler and glycerin contain recyclable content, and castor oil contains renewable content. The surfactants, catalysts, water, and glass fibers are not considered to contain renewable or recyclable content. The use of castor oil as the polyol provides a polyurethane component of the composite with a total environmental content of 37.45 wt %, and the total environmental content for Composite 3 is 78.83%.

TABLE 3

Composite 3

| Ingredient | Units | Renewable Content, % | Renewable Units | Recyclable Units |
|---|---|---|---|---|
| Fly ash | 665.03 | 0 | — | 665.03 |
| Castor Oil | 18.00 | 100 | 18.00 | — |
| Ecopol 131 | 80.00 | 40 | 32.00 | 32.00 |
| Glycerin | 2.00 | 0 | — | 2.00 |
| Surfactant | 1.00 | 0 | — | — |
| Catalyst | 1.00 | 0 | — | — |
| Water | 1.70 | 0 | — | — |
| Fiber | 57.00 | 0 | — | — |
| Isocyanate | 124.29 | 0 | — | — |
| Delayed catalyst | 0.02 | 0 | — | — |
| Total Units | 950.04 | | | |
| Total Renewable Units | — | — | 50.00 | — |
| Total Recyclable Units | — | — | — | 699.03 |
| % Fly Ash | 70.00 | | | |
| % Renewable Content | 5.26 | | | |
| % Recyclable Content | 73.57 | | | |
| Total Environmental Content | 78.83 | | | |

Composites 1-3 used as examples above are all based upon a filler loading of about 70 wt % fly ash. However, filler loading can be increased to about 85 wt % fly ash or greater, which would increase the total environmental content (other component amounts being held constant).

A method of preparing a composite material is also described herein. The method includes mixing (1) an isocyanate selected from the group consisting of diisocyanates, polyisocyanates, and mixtures thereof; (2) at least two polyols, the at least two polyols including (i) a high hydroxyl number polyol selected from polyether polyols and polyester polyols, the high hydroxyl number polyol having a hydroxyl number greater than 250 and being from about 1% to about 25% by weight of the total polyol content used to form the polyurethane, and (ii) a low hydroxyl number polyol selected from polyether polyols and polyester polyols, the low hydroxyl number polyol having a hydroxyl number of 250 or lower; (3) coal ash (e.g., fly ash) present in amounts from about 40% to about 90% by weight of the composite material; and (4) a catalyst. The isocyanate and the at least two polyols are allowed to react in the presence of the coal ash and catalyst to form the composite material.

The composite material can be produced using a batch, semi-batch, or continuous process. At least a portion of the mixing step, reacting step, or both, can be conducted in a mixing apparatus such as a high speed mixer or an extruder. The method can further include the step of extruding the resulting composite material through a die or nozzle. In some embodiments, a mixing step of the method used to prepare the composite materials described herein includes: (1) mixing the polyol and fly ash; (2) mixing the isocyanate with the polyol and the fly ash; and (3) mixing the catalyst with the isocyanate, the polyol, and the fly ash. In some embodiments, a mixing step of the method used to prepare the composite materials described herein includes mixing the liquid ingredients (i.e., the polyol, isocyanate, catalyst, surfactants, and water) and then combining the mixed liquid ingredients with the fly ash and optional fiber. As the composite material exits the die or nozzle, the composite material may be placed in a mold for post-extrusion curing and shaping. For example, the composite material can be allowed to cure in individual molds or it can be allowed to cure in a continuous forming system such as a belt molding system.

An ultrasonic device can be used for enhanced mixing and/or wetting of the various components of the composite materials described herein. Such enhanced mixing and/or wetting can allow a high concentration of filler (e.g., fly ash) to be mixed with the polyurethane matrix, including about 40 wt %, about 50 wt %, about 60 wt %, about 70 wt %, about 80 wt %, and about 90 wt % of the inorganic filler. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The composite materials described herein can be foamed. The at least two polyols and the isocyanate can be allowed to produce a foamed composite material after mixing the components according to the methods described herein. The composite materials described herein can be formed while they are actively foaming or after they have foamed. For example, the material can be placed under the pressure of a mold cavity prior to or during the foaming of the composite material. When a foaming composite material is molded by a belt molding system into a product shape, the pressure that the foamed part exerts on the belts impacts the resulting mechanical properties. For example, as the pressure of the foaming increases and if the belt system can hold this pressure without the belts separating, then the product may have higher flexural strength than if the belts allowed leaking or pressure drop.

The composite materials described herein can be formed into shaped articles and used in various applications including building materials. Examples of such building materials include siding material, roof coatings, roof tiles, roofing material, carpet backing, flexible or rigid foams such as automotive foams (e.g., for dashboard, seats, or roofing), component coating, and other shaped articles. Examples of shaped articles made using composite materials described herein include roofing material such as roof tile shingles; siding material; trim boards; carpet backing; synthetic lumber; building panels; scaffolding; cast molded products; decking materials; fencing materials; marine lumber; doors; door parts; moldings; sills; stone; masonry; brick products; posts; signs; guard rails; retaining walls; park benches; tables; slats; and railroad ties. The composite materials described herein further can be used as reinforcement of composite structural members including building materials such as doors; windows; furniture; and cabinets and for well and concrete repair. The composite materials described herein also can be used to fill gaps, particularly to increase the strength of solid surface articles and/or structural components. The composite materials can be flexible, semi-rigid, or rigid foams. In some embodiments, the flexible foam is reversibly deformable (i.e., resilient) and can include open cells. A 8"×1"×1" piece of a flexible foam can generally wrap around a 1" diameter mandrel at room temperature without rupture or fracture. Flexible foams also generally have a density of less than 5 lb/ft$^3$ (e.g. 1 to 5 lb/ft$^3$). In some embodiments, the rigid foam is irreversibly deformable and can be highly crosslinked and/or can include closed cells. Rigid foams generally have a density of 5 lb/ft$^3$ or greater (e.g. 5 to 60 lb/ft$^3$, 20 to 55 lb/ft$^3$, or 30 to 50 lb/ft$^3$).

The composites and methods of the appended claims are not limited in scope by the specific composites and methods described herein, which are intended as illustrations of a few aspects of the claims and any composites and methods that are functionally equivalent are intended to fall within the scope of the claims. Various modifications of the composites and methods in addition to those shown and described herein are intended to fall within the scope of the appended claims. Further, while only certain representative composite materials and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term comprising and variations thereof as used herein is used synonymously with the term including and variations thereof and are open, non-limiting terms. Although the terms comprising and including have been used herein to describe various embodiments, the terms "consisting essentially of" and "consisting of" can be used in place of "comprising" and "including" to provide for more specific embodiments of the invention and are also disclosed.

That which is claimed:

1. A rigid composite material comprising:
   a polyurethane formed by the reaction of an isocyanate selected from the group consisting of diisocyanates, polyisocyanates and mixtures thereof, and at least two polyols, the at least two polyols comprising:
   a high hydroxyl number polyol selected from the group consisting of polyether polyols and polyester polyols, the high hydroxyl number polyol having a hydroxyl number greater than 250 and having 75% or greater primary hydroxyl groups, wherein the high hydroxyl number polyol includes an aromatic polyester polyol and wherein the high hydroxyl number polyol comprises from about 1% to about 25% by weight of the total polyol content used to form the polyurethane, and
   a low hydroxyl number polyol selected from the group consisting of polyether polyols and polyester polyols, the low hydroxyl number polyol having a hydroxyl number of 250 or lower; and
   from about 40% to about 90% by weight coal ash,
   wherein the composite material has a density of 5 lb/ft$^3$ or greater.

2. The composite material of claim 1, wherein the coal ash is fly ash.

3. The composite material of claim 1, wherein the high hydroxyl number polyol includes a plant-based polyol and/or the low hydroxyl number polyol includes a plant-based polyol.

4. The composite material of claim 1, wherein the low hydroxyl number polyol includes castor oil.

5. The composite material of claim 1, wherein the low hydroxyl number polyol includes castor oil and the high hydroxyl number polyol includes a soybean oil-based polyol.

6. The composite material of claim 5, wherein the soybean oil-based polyol is formed by the reaction of a soybean oil and a polyester.

7. The composite material of claim 6, wherein the soybean oil and polyester based polyol is prepared using recycled polyester.

8. The composite material of claim 1, wherein the high hydroxyl number polyol comprises from about 1% to about 15% by weight of the total polyol content used to form the polyurethane.

9. The composite material of claim 1, wherein the polyurethane component has a total environmental content of greater than 35%.

10. The composite material of claim 1, wherein the polyurethane component has a total environmental content of greater than 40%.

11. The composite material of claim 1, wherein the polyurethane component has a total environmental content of greater than 45%.

12. The composite material of claim 1, wherein the polyurethane component has a total environmental content of about 50%.

13. The composite material of claim 1, wherein the composite material has a total environmental content of greater than 75%.

14. The composite material of claim 1, wherein the composite material has a total environmental content of greater than 80%.

15. The composite material of claim 1, wherein the composite material has a total environmental content of greater than about 85%.

16. The composite material of claim 1, wherein the composite material is foamed.

17. The composite material of claim 1, further comprising glass fibers.

18. The composite material of claim 1, wherein the fly ash is from about 60% to about 85% by weight.

19. The composite material of claim 1, wherein the low hydroxyl number polyol has a hydroxyl number of lower than 180.

20. A building material comprising the composite material of claim 1.

21. The building material of claim 20, wherein the building material is selected from the group consisting of siding material, carpet backing, building panels, and roofing material.

22. The composite material of claim 1, wherein the low hydroxyl number polyol has a hydroxyl number of lower than 170.

23. A method of preparing a rigid composite material comprising:
   mixing (1) an isocyanate selected from the group consisting of diisocyanates, polyisocyanates and mixtures thereof, (2) at least two polyols, the at least two polyols comprising (i) a high hydroxyl number polyol selected from the group consisting of polyether polyols and polyester polyols, the high hydroxyl number polyol having a hydroxyl number greater than 250 and having 75% or greater primary hydroxyl groups, wherein the high hydroxyl number polyol includes an aromatic polyester polyol and wherein the high hydroxyl number polyol comprises from about 1% to about 25% by weight of the total polyol content used to form the polyurethane, and (ii) a low hydroxyl number polyol selected from the group consisting of polyether polyols and polyester polyols, the low hydroxyl number polyol having a hydroxyl number of 250 or lower, (3) coal ash, and (4) a catalyst; and
   allowing the isocyanate and the at least two polyols to react in the presence of the coal ash and catalyst to form the composite material,
   wherein the amount of coal ash added in the mixing step comprises from about 40% to about 90% by weight of the composite material,
   wherein the composite material has a density of 5 lb/ft$^3$ or greater.

24. The method of claim 23, wherein the low hydroxyl number polyol has a hydroxyl number of lower than 180.

25. The method of claim 23, wherein the high hydroxyl number polyol, when replacing the polyol used in the standard polyurethane formulation of the Brookfield Viscosity Test, produces a Brookfield viscosity of over 50,000 cP in less than 225 seconds.

26. The composite material of claim 1, wherein the composite material has a density of 20 lb/ft$^3$ to 60 lb/ft$^3$.

27. The method of claim 23, wherein the composite material has a density of 20 lb/ft$^3$ to 60 lb/ft$^3$.

28. The composite material of claim 1, wherein the low hydroxyl number polyol comprises from about 75% to about 99% by weight of the total polyol content used to form the polyurethane.

29. The method of claim 23, wherein the low hydroxyl number polyol comprises from about 75% to about 99% by weight of the total polyol content used to form the polyurethane.

30. A method of preparing a rigid composite material comprising:
mixing (1) an isocyanate selected from the group consisting of diisocyanates, polyisocyanates and mixtures thereof, (2) at least two polyols, the at least two polyols comprising (i) a high hydroxyl number polyol selected from the group consisting of polyether polyols and polyester polyols, the high hydroxyl number polyol having a hydroxyl number greater than 250 and having 75% or greater primary hydroxyl groups, wherein the high hydroxyl number polyol comprises an aromatic polyester polyol and the high hydroxyl number polyol comprises from about 1% to about 25% by weight of the total polyol content used to form the polyurethane, and (ii) a low hydroxyl number polyol selected from the group consisting of polyether polyols and polyester polyols, the low hydroxyl number polyol having a hydroxyl number of 250 or lower, (3) coal ash, and (4) a catalyst; and
allowing the isocyanate and the at least two polyols to react in the presence of the coal ash and catalyst to form the composite material,
wherein the high hydroxyl number polyol, when replacing the polyol used in the standard polyurethane formulation of the Brookfield Viscosity Test, produces a Brookfield viscosity of over 50,000 cP in less than 225 seconds,
wherein the amount of coal ash added in the mixing step comprises from about 40% to about 90% by weight of the composite material, and
wherein the composite material has a density of 5 lb/ft$^3$ or greater.

* * * * *